United States Patent Office 3,640,974
Patented Feb. 8, 1972

3,640,974
MODIFYING POLYMERS
David S. Breslow, Madelyn Gardens, Wilmington, Del.,
assignor to Hercules Incorporated, Wilmington, Del.
No Drawing. Filed May 5, 1969, Ser. No. 822,037
Int. Cl. C08f 3/20, 27/08
U.S. Cl. 260—78.5                              10 Claims

ABSTRACT OF THE DISCLOSURE

Vinyl chloride and vinylidene chloride polymers can be cross-linked or otherwise modified by reaction with a poly(diazo) compound selected from the group of

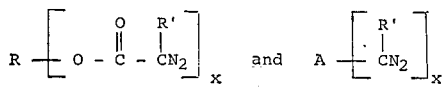

where $x$ is an integer greater than 1, R is an organic radical inert to modification reactions, A is an aromatic radical inert to modification reactions, and R' is a hydrogen, aryl or —COOZ radical where Z is an alkyl or aryl radical. The reaction between the poly(diazo) compound and polymer can be initiated either by heating or by exposing to ultraviolet radiation.

This invention relates to modifying certain nonhydrocarbon polymers and to the products so produced. More particularly, the invention relates to modifying nonhydrocarbon polymers with certain poly(diazo) compounds and to the products so produced.

Vinyl chloride polymers and vinylidene chloride polymers are well known in the rubber, wire coating, pipe and foam fields. In some uses the polymers must be cross-linked or otherwise modified to offer the best physical properties. Such methods as peroxide treatment and electron bombardment are reported in the prior art for crosslinking these polymers. However, these methods offer certain drawbacks.

Now in accordance with this invention it has unexpectedly been found that vinyl chloride polymers and vinylidene chloride polymers can be cross-linked with certain poly(diazo) compounds to produce vulcanizates that are tough, resilient, solvent-resistant, and odor free. In addition it has been found that these polymers can be treated with smaller amounts of the poly(diazo) compounds to improve their properties without materially affecting their solubility.

The poly(diazo) compounds useful in the process of this invention are selected from the group consisting of

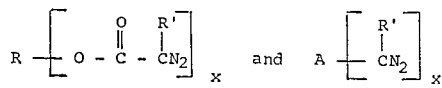

where $x$ is an integer greater than 1, preferably from 2 to 100, R is an organic radical inert to modification reactions, A is an aromatic radical inert to modification reactions, and R' is a hydrogen, aryl or —COOZ radical where Z is an alkyl or aryl radical. Exemplary of these poly(diazo) compounds are the bis(diazoacetate) ester of 1,6-hexanediol, the bis(diazoacetate) ester of 1,10-decanediol, the tris(diazoacetate) ester of trimethylolethane, the tetrakis(diazoacetate) ester of pentaerythritol, the bis(diazoacetate) ester of diethylene glycol, the bis (diazoacetate) ester of dioxyethylene sulfide, the bis (diazoacetate) ester of p-hydroxymethylbenzyl alcohol, the bis(α-diazo-α-phenylacetate) ester of 1,10-decanediol, the bis(α-diazo-α-phenylacetate) ester of hydroquinone, the bis(α-diazo-α-carbomethoxyacetate) ester of 1,4-butanediol, the bis(α-diazo-α-carbophenoxyacetate) ester of 1,6-hexanediol, p-bis(diazomethyl)benzene, α,α'-bis (diazo)-α,α'-bis(phenyl)m-xylene, α,α'-bis(diazo)-α,α'-bis(carbomethoxy)-p-xylene, α,α'-bis(diazo)-α,α'-bis (carbophenoxy) p-xylene, etc. These poly(diazo) compounds can be prepared in various ways as, for example, by diazotizing the corresponding poly(amines).

Unlike azo compounds which upon heating produce a free radical, diazo compounds liberate nitrogen and produce a carbene, i.e., a carbon containing a sextet of electrons. Therefore, it is believed that the poly(diazo) compounds react by eliminating nitrogen leaving a carbene group at each end of the molecule. These free carbene groups, it is believed, react with the carbon groups in the polymers.

As stated above the polymers modified in accordance with this invention are the vinyl chloride polymers containing at least about 50 mole percent of vinyl chloride such as poly(vinyl chloride), vinyl chloride-vinyl acetate copolymers, vinyl chloride-propylene copolymers, vinyl chloride-ethylene copolymers, vinyl chloride-vinylidene chloride copolymers, vinyl chloride-maleic anhydride copolymers, vinyl chloride-fumaric acid copolymers, vinyl chloride-vinyl butyral copolymers, vinyl chloride-vinylidene chloride-acrylonitrile terpolymers, vinyl chloride-vinyl acetate-maleic anhydride terpolymers, etc., and the vinylidene chloride polymers containing at least about 50 mole percent of vinylidene chloride such as poly(vinylidene chloride), vinylidene chloride-vinyl acetate copolymers, vinylidene chloride-vinyl chloride copolymers, vinylidene chloride-maleic anhydride copolymers, etc.

The modification of this invention can be carried out by either heating the polymer plus the poly(diazo) compound above its decomposition temperature or by exposing the mixture to ultraviolet radiation. Various amounts of the poly(diazo) compound can be added, the optimum amount depending on the amount of crosslinking or other modification desired, the specific poly(diazo) compound employed, etc. In general, the amount added (based on the weight of the polymer) will be from about 0.005% to about 25%, most preferably from about 0.01% to about 20% and more particularly from about 0.1% to about 10%.

The modifying agent can be incorporated with the polymer in any desired fashion; for example, it can be uniformly blended by simply milling on a conventional rubber mill. By this means the diazo compound is distributed throughout the polymer and uniform cross-linking or other modifications is effected when the blend is either subjected to heat or ultraviolet radiation. Other methods of mixing the modifying agent with the polymer will be apparent to those skilled in the art.

The temperature at which modification is effected can be varied over a wide range. When cross-linking or other modification is effected by heating, the temperature will depend on the decomposition temperature of the poly(diazo) compound. In general, the temperature will be in the range of from about 0° C. to about 250° C.

In addition to the poly(diazo) compound other ingredients can also be incorporated. The additives commonly used in rubber vulcanizates can be used here also as for example, extenders, fillers, pigments, plasticizers, stabilizers, softeners, processing lubricants, etc. The presence of a stabilizer and in particular an acid acceptor such as a lead compound (e.g. lead stearate), calcium stearate, magnesium oxide or an organo tin mercaptide is particularly beneficial. Exemplary of the fillers that can be added are calcium carbonate, carbon black, silica, calcium silicate (hydrated), etc. When cross-linking or other modification is effected by irradiation, additives should be used in amounts which do not inhibit the passage of the radiation. Obviously, there are many cases in which an additive is not required or desired and excellent results are achieved when only the poly(diazo) compound is added.

The following examples are presented for purposes of illustration, parts and percentages being by weight unless otherwise specified.

The extent to which the polymers are cross-linked is indicated by the percent gain in insolubility in solvents in which the uncross-linked polymer was soluble, hereinafter termed "percent gel." Percent gel is determined as follows: a weighed sample of polymer is soaked in such a solvent for a specified length of time. The sample is then removed and dried to constant weight. The weight of initial and final sample are corrected for polymer and copolymer content based on knowledge of components. From these figures $$\frac{\text{corrected dry weight}}{\text{corrected initial weight}} \times 100 = \text{percent gel}$$

EXAMPLE 1

This example illustrates the cross-linking of poly(vinyl chloride) with a bis(diazoacetate).

To 100 parts of tetrahydrofuran was added one part of poly(vinyl chloride) having a specific viscosity of 0.55 as determined on a 4% solution of nitrobenzene at 20° C. To the resulting solution was added 0.1 part of lead stearate stabilizer, The dispersion was transferred to an evaporating dish, a methylene chloride solution of hexamethylene bis(diazoacetate) amounting to 3% by weight, based on the polymer, was added and the solvent evaporated off under a stream of nitrogen over a 4 hour period. The resulting film was cured at a temperature of 170° C. for 45 minutes in a nitrogen atmosphere. The resulting vulcanizate was tested for percent gel by soaking overnight in 100 parts of tetrahydrofuran. The thus-treated product had a percent gel of 99. A control sample was prepared in exactly the same way except no hexamethylene bis(diazoacetate) was added. It had a percent gel of 0.

EXAMPLE 2

A sample of the poly(vinyl chloride) described in Example 1 containing 12% by weight of chlorinated polyethylene processing aid was cross-linked with 2% by weight of hexamethylene bis(diazoacetate) exactly as described in Example 1 except that in place of the lead stearate 0.1 part of organo tin mercaptide stabilizer was added. The resulting product had a percent gel of 89.

EXAMPLE 3

This example illustrates the cross-linking of a vinyl chloride-vinyl acetate copolymer containing 86 weight percent of vinyl chloride.

The sample of vinyl chloride-vinyl acetate copolymer was cross-linked exactly the same as the poly(vinyl chloride) in Example 2. The resulting vulcanizate had a percent gel of 76.

EXAMPLE 4

This example illustrates the cross-linking of poly(vinylidene chloride) with p-bis(diazomethyl) benzene.

To 100 parts of tetrahydrofuran was added one part of poly(vinylidene chloride) having a specific viscosity of 0.6 as determined on a 4% solution of nitrobenzene at 20° C. To the resulting solution was added 0.1 part of lead stearate and 5% by weight, based on the polymer, of freshly prepared p-bis(diazomethyl) benzene. The solvent was evaporated off under a stream of nitrogen over a 1 hour period. The resulting film was cured at 175° C. for 45 minutes in a nitrogen atmosphere. The resulting vulcanizate was insoluble in tetrahydrofuran while a control sample treated in the same way, except for the addition of the diazo compound, was completely soluble in tetrahydrofuran.

EXAMPLE 5

This example illustrates the cross-linking of the poly(vinyl chloride) described in Example 1 with diethyl hexamethylene bis(diazomalonate).

The poly(vinyl chloride) was cross-linked exactly as described in Example 1 except 2% by weight based on the polymer of the diazomalonate was substituted for the diazoacetate. The resulting vulcanizate had a percent gel of 85 in tetrahydrofuran while a control sample prepared exactly the same way except for the addition of diazomalonate had a percent gel of 0.

EXAMPLE 6

To a solution of the poly(vinyl chloride), described in Example 1, in tetrahydrofuran was added sufficient bis(diazoacetate) ester of 1,10-decanediol to make a solution containing 6 parts of the diazo compound per 100 parts of polymer. A film of the solution was spread on a quartz plate and the solvent evaporated under a stream of nitrogen. The resulting film was exposed to an ultraviolet light source under an atmosphere of nitrogen for one hour at a temperature of 30° C. Quartz equipment was used throughout the reaction. A control film of the polymer containing no diazo compound was subjected to ultraviolet light exactly the same as described above. The control was completely soluble in tetrahydrofuran while the sample treated with diazo compound was insoluble.

What I claim and desire to protect by Letters Patent is:

1. The process of modifying a nonhydrocarbon polymer selected from the group consisting of poly(vinyl chloride), poly(vinylidene chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl butyral copolymers, vinyl chloride-vinylidene chloride-acrylonitrile terpolymers, vinyl chloride-vinyl acetate-maleic anhydride terpolymers, vinylidene chloride-vinyl acetate copolymers, and vinylidene chloride-maleic anhydride copolymers which comprises heating said polymer in admixture with from about 0.005% to about 25% based on the weight of the polymer of a poly(diazo) compound selected from the group consisting of

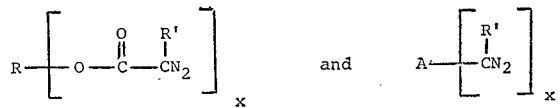

where $x$ is an integer greater than 1, R is an organic radical inert to modification reactions, A is an aromatic radical inert to modification reactions, and R' is selected from the group consisting of hydrogen, aryl and —COOZ radicals where Z is selected from the group consisting of alkyl and aryl radicals.

2. The process of modifying a nonhydrocarbon polymer selected from the group consisting of poly(vinyl chloride), poly(vinylidene chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-vinyl butyral copolymers, vinyl chloride-vinylidene chloride-acrylonitrile terpolymers, vinyl chloride-vinyl acetate-maleic anhydride terpolymers, vinylidene chloride-vinyl acetate copolymers, and vinylidene chloride-maleic anhydride copolymers which comprises irradiating said polymer under ultraviolet radiation in admixture with from about 0.005% to about 25% based on the weight of the polymer of a poly(diazo) compound selected from the group consisting of

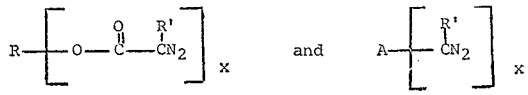 and 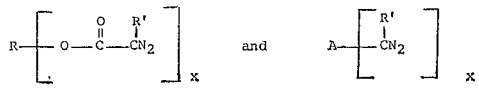

where $x$ is an integer greater than 1, R is an organic radical inert to modification reactions, A is an aromatic radical inert to modification reactions, and R' is selected from the group consisting of hydrogen, aryl and —COOZ radicals where Z is selected from the group consisting of alkyl and aryl radicals.

3. The process of claim 1 wherein the poly(diazo) compound is p-bis(diazomethyl) benzene.

4. The process of claim 1 wherein the poly(diazo) compound is hexamethylene bis(diazoacetate).

5. The process of claim 1 wherein the poly(diazo) compound is diethyl hexamethylene bis(diazomalonate).

6. The process of claim 2 wherein the poly(diazo) compound is the bis(diazoacetate) ester of 1,10-decanediol.

7. A nonhydrocarbon polymer selected from the group consisting of poly(vinyl chloride), poly(vinylidene chloride), vinyl chloride-vinyl acetate copolymers, vinyl chloride-vinylidene chloride copolymers, vinyl chloride-maleic anhydride copolymers, vinyl chloride-fumaric acid copolymers, vinyl chloride-butyral copolymers, vinyl chloride-vinylidene chloride-acrylonitrile terpolymers, vinyl chloride-vinyl acetate-maleic anhydride terpolymers, vinylidene chloride-vinyl acetate copolymers, and vinylidene-maleic anhydride copolymers modified by reacting with from about 0.005% to about 25% based on the weight of the polymer of a poly(diazo) compound selected from the group consisting of where $x$ is an integer greater than 1, R is an organic radical inert to modification reactions, A is an aromatic radical inert to modification reactions, and R' is selected from the group consisting of hydrogen, aryl and —COOZ radicals where Z is selected from the group consisting of alkyl and aryl radicals.

8. The product of claim 7 wherein the nonhydrocarbon polymer is poly(vinyl chloride).

9. The product of claim 7 wherein the nonhydrocarbon polymer is a vinyl chloride-vinyl acetate copolymer.

10. The product of claim 7 wherein the nonhydrocarbon polymer is poly(vinylidene chloride).

References Cited
UNITED STATES PATENTS 3,274,166  9/1966  Breslow et al. _____ 260—85.1
3,284,421  11/1966  Breslow _____ 260—80.72

JOSEPH L. SCHOFER, Primary Examiner

J. KIGHT, Assistant Examiner

U.S. Cl. X.R.

204—163; 260—41 B, 79.5 P, 80.6, 80.77, 85.5 S, 86.3, 87.5 R, 87.1, 87.7, 91.7, 92.8 A